US006323452B1

(12) United States Patent
Bonnet (10) Patent No.: US 6,323,452 B1
(45) Date of Patent: Nov. 27, 2001

(54) FEEDING SYSTEM AND METHOD FOR PLACING A PLURALITY OF OBJECTS ON A TRAY OF AN AUTOMATED SORTING SYSTEM

(75) Inventor: Henri Bonnet, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 09/368,757

(22) Filed: Aug. 5, 1999

(51) Int. Cl.[7] .................................................. B07C 5/00
(52) U.S. Cl. ...................... 209/583; 209/592; 209/911; 209/918; 198/370.04
(58) Field of Search .................................. 209/577, 579, 209/583, 592, 593, 912, 645, 911, 918; 198/370.01, 370.03, 370.04

(56) References Cited

U.S. PATENT DOCUMENTS

| 3,034,665 | 5/1962 | Speaker . |
|---|---|---|
| 3,436,968 | 4/1969 | Unger et al. . |
| 3,485,339 | 12/1969 | Miller et al. . |
| 3,515,254 | 6/1970 | Gary . |
| 3,531,002 | 9/1970 | Lemelson . |
| 3,581,071 | 5/1971 | Payseure . |
| 3,817,368 | 6/1974 | Wentz et al. . |
| 3,822,009 | 7/1974 | Richards . |
| 4,089,404 | 5/1978 | Venzke . |
| 4,256,434 | 3/1981 | Stodt et al. . |
| 4,279,557 | 7/1981 | Stodt et al. . |
| 4,419,384 | 12/1983 | Kane et al. . |
| 4,557,386 | 12/1985 | Buckley et al. . |
| 4,604,704 | 8/1986 | Eaves et al. . |
| 4,687,107 | 8/1987 | Brown et al. . |
| 4,692,876 | 9/1987 | Tenma et al. . |
| 4,846,335 | 7/1989 | Hartlepp . |
| 4,911,281 | 3/1990 | Jenkner . |
| 4,915,209 | 4/1990 | Canziani . |
| 5,018,928 | 5/1991 | Hartlepp . |
| 5,054,601 | 10/1991 | Sjogren et al. . |
| 5,060,457 | 10/1991 | Zambelli . |
| 5,255,774 | 10/1993 | Yokoya . |

(List continued on next page.)

FOREIGN PATENT DOCUMENTS

| 3738587 A1 | 5/1989 | (DE) . |
|---|---|---|
| 4338801 A1 | 5/1995 | (DE) . |
| 0 415 771 A2 | 3/1991 | (EP) . |
| 0888525 A | 1/1999 | (EP) . |
| 0927689 A | 7/1999 | (EP) . |
| 2576528 A | 8/1986 | (FR) . |
| 2656715 * | 7/1991 | (FR) ..................................... 209/583 |
| WO 96/32205 | 10/1996 | (WO) . |
| WO 98/08759 | 3/1998 | (WO) . |
| WO 98/23511 | 6/1998 | (WO) . |
| WO 98/30476 | 7/1998 | (WO) . |
| WO 98/31614 | 7/1998 | (WO) . |
| WO 98/31615 | 7/1998 | (WO) . |
| WO 98/33729 | 8/1998 | (WO) . |
| WO 98/49076 | 11/1998 | (WO) . |

*Primary Examiner*—Tuan N. Nguyen
(74) *Attorney, Agent, or Firm*—Alston & Bird LLP (57) ABSTRACT

A feeding system and method for placing a plurality of objects within a single designated destination area of a sorting system to increase the throughput rate of the system. The disclosed sorting system includes a plurality of carriages movable under the control of a programmable controller between the loading and unloading stations of the sorting system, each carriage carrying a tilt tray. The geographic destination of each of the objects to be placed on a tray, as well as a dimension of each of the objects to be placed on a tray, is determined by an optical scanner and a measuring device. The controller uses the dimension information to determine whether more than one object having the same geographic destination may be placed on the same tray. The invention is adaptable for use with other types of sorting systems.

20 Claims, 6 Drawing Sheets

U.S. PATENT DOCUMENTS

| | | |
|---|---|---|
| 5,284,252 | 2/1994 | Bonnet . |
| 5,301,544 | 4/1994 | Smith . |
| 5,331,118 | 7/1994 | Jensen . |
| 5,388,681 | 2/1995 | Bonnet . |
| 5,441,141 | 8/1995 | Bonnet . |
| 5,451,771 | 9/1995 | Robertson . |
| 5,484,049 | 1/1996 | Huang et al. . |
| 5,505,291 | 4/1996 | Huang et al. . |
| 5,570,773 | 11/1996 | Bonnet . |
| 5,579,922 * | 12/1996 | Arlt et al. ............................ 209/592 |
| 5,672,815 | 9/1997 | Prutu . |
| 5,711,410 | 1/1998 | Cai et al. . |
| 5,860,504 | 1/1999 | Lazzarotti . |
| 5,868,238 | 2/1999 | Bonnet . |
| 5,868,239 | 2/1999 | Bonnet . |
| 5,950,798 | 9/1999 | Bonnet . |
| 5,967,290 | 10/1999 | Bonnet . |
| 5,990,437 * | 11/1999 | Coutant et al. ...................... 209/583 |

\* cited by examiner

FEEDING SYSTEM AND METHOD FOR PLACING A PLURALITY OF OBJECTS ON A TRAY OF AN AUTOMATED SORTING SYSTEM

FIELD OF THE INVENTION

The present invention relates to conveyor sorting systems and the automated sorting of objects, and more particularly relates to a feeding system for placing a plurality of objects on a single tray bound for the same geographic destination.

BACKGROUND OF THE INVENTION

Daily, package delivery companies collect millions of packages from thousands of locations scattered over large geographical areas and transport them to sorting facilities for processing. After processing, the packages are carried to an equally large number of destinations. To meet the rigorous schedule of today's business environment while providing accurate deliveries of packages, sorting facilities are equipped with automated transfer systems whenever possible. These transfer systems must be fast, durable, easy to repair or replace, and provide gentle but accurate handling of each package. Furthermore, automatic sorting systems are often used in connection with handling product inventories, assembling ordered items for shipment, and delivering parts to locations where they are needed in manufacturing operations.

Parcel shipping companies now have sorting facilities equipped with automated sorting and transfer systems that provide significantly improved package handling compared to manual labor. Some of these known sorting systems tilt tray conveyor systems in which packages to be sorted are loaded on tilt trays. The trays are mounted on carriages that are driven in lines or trains past one or more loading stations at which packages are placed on the trays. The trays are then moved past a plurality of unloading stations each corresponding to a geographical destination. Typically, each package is loaded alone onto the first empty tilt tray as it passes the loading station and is unloaded at an unloading station corresponding with the package's geographic destination. Examples of tilt tray sorting systems are shown and described in U.S. Pat. Nos. 5,570,773 and 5,388,681. Other systems remove packages from trays or conveyors by pushing them off laterally or diverting them with stationary or pivoting barriers. Others use live roller beds to discharge the packages. All of these systems typically discharge one package at a time. Further examples of sorting systems may be found in U.S. Pat. Nos. 5,655,643; 5,868,239; 5,284,252; 5,441,141; PCT Publication No. WO98/08759; PCT Publication No. WO98/31614; PCT Publication No. WO98/31615; PCT Publication No. WO98/33729; and PCT Publication No. WO98/49076.

The capacity of an automated sorting system depends on the number of trays, the number of loading and unloading stations, and the speed of the equipment. During holiday seasons when package volume is high, the capacity of the sorting system can become a limiting factor in the delivery company's ability to make promised delivery deadlines. However, it may not be practical to increase the number of trays, the number of loading and unloading stations, or the speed of the system. For example, the size of the sorting facility may be limited by the available space.

The tilt trays of these known sorting systems are sized for receiving the largest of a variety of differently sized packages. Only in rare circumstances does a single package require the entire surface of a single tray. Thus, the carrying capacity of the tilt trays generally is under-utilized.

Accordingly, in order to increase the throughput rate of automated sorting systems, there is a need for a loading system for placing a plurality of objects bound for the same geographic destination on a single tray.

SUMMARY OF THE INVENTION

The present invention seeks to increase the capacity of automated sorting systems without increasing the size or speed of the system. This object is accomplished in the present invention by providing a feeding system and method that can place a plurality of packages bound for the same geographic destination on a single tray of an automated sorting system.

Generally described, the present invention provides a feeding system for placing a plurality of objects on a conveying device of a sorting system adapted to transport and distribute a series of objects from loading stations to unloading stations, comprising a data input device; a programmable controller connected to receive from the data input device data indicating a destination and a dimension of each of the objects; a conveying device movable under the control of the programmable controller between loading and unloading stations of the sorting system; and a feeding station adjacent to a path of the conveying device, including one or more feed conveyors positioned to load the objects onto designated destination areas of the conveying device; the controller being responsive to the destination and dimension data to determine when two or more objects sharing a common destination will fit within a single designated destination area of the conveying device, and to operate the one or more feed conveyors to load the two or more objects onto the designated destination area.

In a preferred embodiment, the loading of the second of the two objects onto the designated destination area is done by a second downstream feed conveyor while continuing to move the conveying device. This approach maintains the speed of the system.

The destination data may refer to any location. For example, it may refer to a geographic location, such as a zip code area, or a location within the sorting system, such as a particular unloading station or conveyor, or a place within a shipping company's delivery system, such as a hub facility, or a transportation device, such as a tractor trailer, rail car, or local delivery vehicle.

Optionally, the controller may, responsive to destination and dimension data, determine when three objects sharing a common destination will fit within one designated destination area of the conveying device, and operate the feed conveyors to load the three objects onto the designated destination area. Preferably, the third object is loaded by a third feed conveyor.

In a preferred embodiment, the sorting system is a tilt tray sorter, and the designated destination area of the conveying device comprises a tilt tray. The measured dimension of the objects in this embodiment may be a width of each of the objects in a feed direction in which the object moves during loading, and the controller may compare the combined widths of the objects to the width of the tray to determine when two objects sharing a common destination will fit on the tray. The data input device may include sensors operative to measure the width between the leading and trailing edges of objects as they move on the feeding conveyor, and an optical scanner positioned to read destination indicia affixed to the objects. The optical scanner may be, for example, a CCD camera or a laser bar code scanner. In a less preferred embodiment, the data input device may be an interface for human input of destination and dimension data, such as a keyboard or a voice recognition device.

In the alternative, an imaging scanner can be positioned to obtain an image of the tilt tray after a first package has been loaded. The controller then can determine a first footprint of the first object on the tilt tray, and a second footprint of the second object still on its feed conveyor, and compare a combined footprint of the objects to a footprint threshold to determine when two objects sharing a common destination will fit on the tray.

In a further alternative, the data input device may include a scale connected to the programmable controller for determining the weight of each of the objects to be placed within the designated destination area, the programmable controller may compare a combined weight of the objects to an acceptable weight threshold prior to loading the second object. An example of such a scale is a plurality of load cells positioned underneath a feed conveyor.

The present invention also provides a method for placing a plurality of objects on a conveying device of a sorting system adapted to transport and distribute a series of objects from loading stations to unloading stations of the sorting system, comprising the steps of reading destination information from the objects; measuring a dimension of the objects; at a first loading station, loading a first object onto the conveying device within a designated destination area; determining whether a second object having the same destination as the first object will fit within the designated destination area with the first object; and if the second object will fit within the designated destination area with the first object, loading the second object onto the designated destination area. In a preferred embodiment, the second object is loaded at a second loading station. In the preferred embodiment, the method may include programming a controller to store destination and dimension information about a plurality of objects waiting to be loaded onto the sorting system, and to coordinate the loading sequence of the objects from the loading stations to place more than one object within a designated destination area when possible, thereby to optimize utilization of the capacity of the sorting system.

Other objects, features, and advantages of the present invention will become apparent from the following detailed description of embodiments of the invention, when taken in conjunction with the drawings and the appended claims.

DETAILED DESCRIPTION

Figure 1:
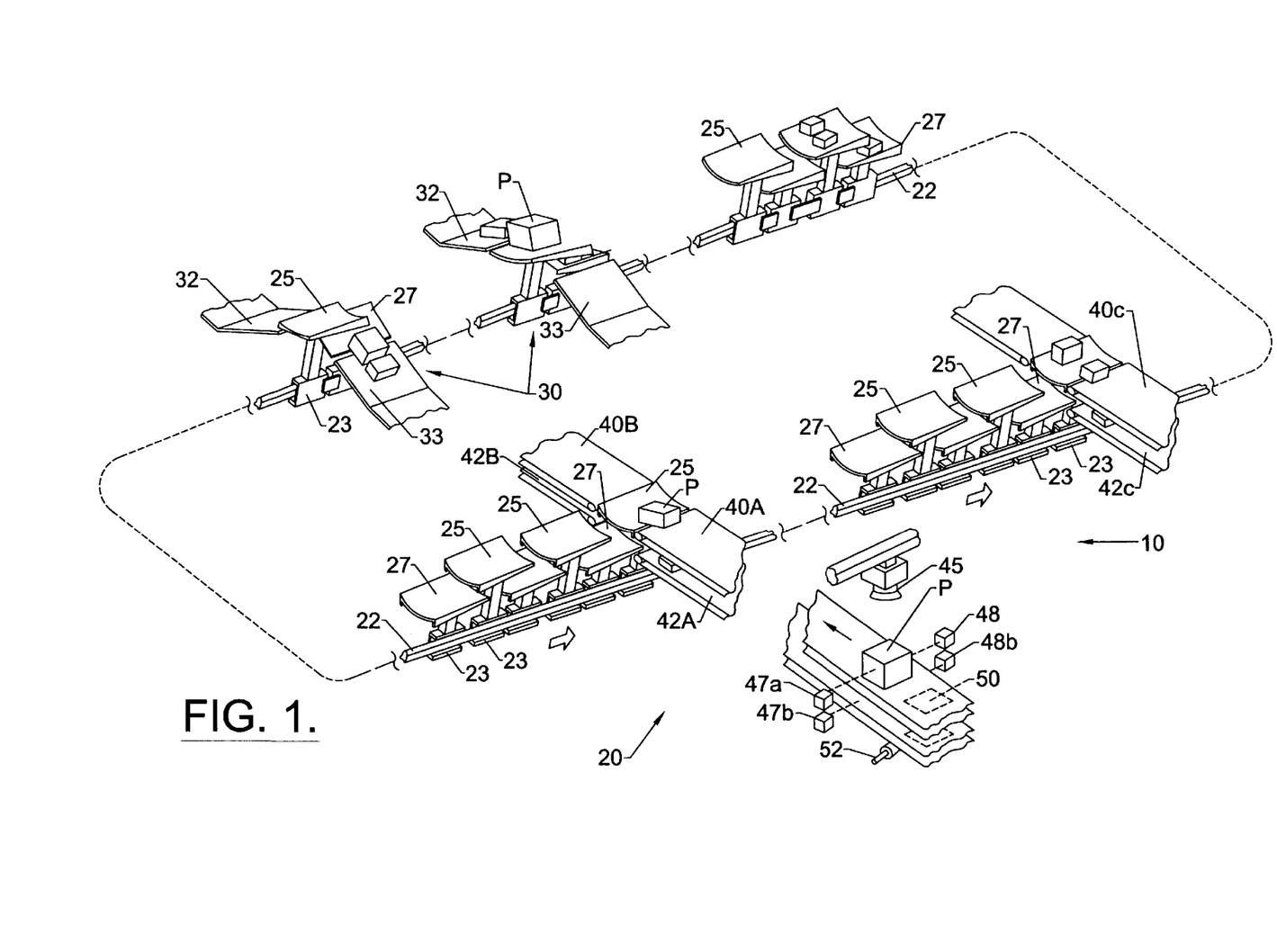
FIG. 1 is a pictorial view of an automated sorting system embodying a feeding system of the present invention.
Figure 2:
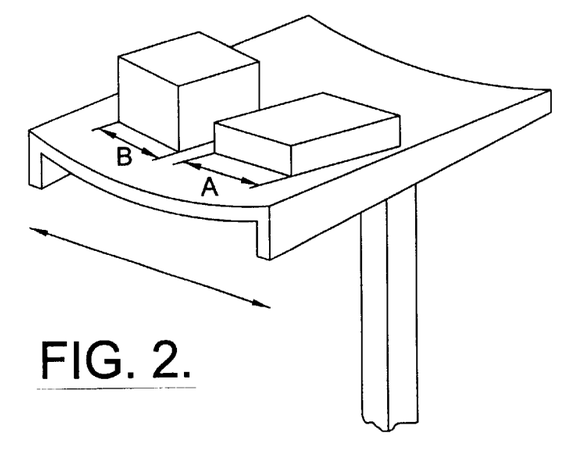
FIG. 2 is an isolated pictorial view of a tilt tray holding two packages.
Figure 3:
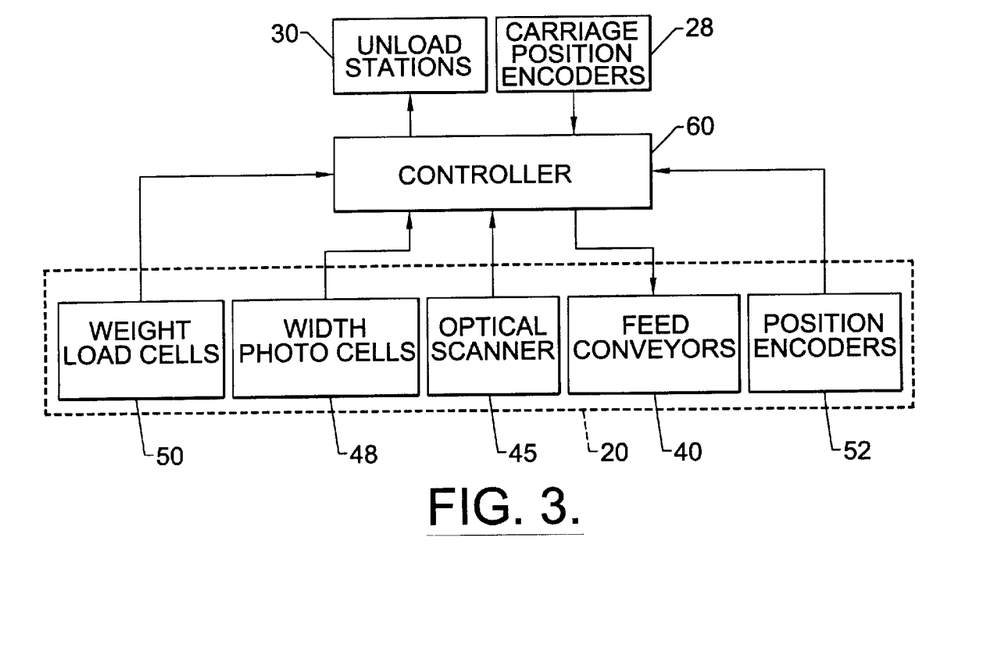
FIG. 3 is a block diagram illustrating aspects of the control circuit of the sorting system of FIG. 1.

Referring now to the drawings, in which like numerals indicate like elements throughout the several views, FIGS. 1–3 illustrate a sorting system 10 including a feeding station 20 embodying the present invention. The invention will be disclosed in the context of a tilt tray sorting system of the type shown in U.S. Pat. No. 5,570,773, which is incorporated herein by reference. The sorting system 10 includes a monorail 22 and a line or train of carriages 23 mounted for travel along the monorail 22, which forms a closed loop in the preferred form shown. The carriages 23 each carry either an upper tilt tray 25 or a lower tilt tray 27, and are driven along the monorail in one direction. The position of the carriages is tracked with one or more position encoders 28 (FIG. 3) in a known manner. As they traverse the monorail, the tilt trays pass one or more of the feeding stations 20, where they receive packages P, and a plurality of unloading stations 30, where the trays are tilted in a known manner to discharge the packages onto an upper chute 32 or a lower chute 33.

The invention also can be embodied in a single level tilt tray sorting system, and in other types of sorting systems in which individual objects can be identified and routed to one of at least two destinations. For example, some carriage sorting systems discharge objects using on-board powered rollers or adjacent movable arms that push objects off the carriages. Other sorting systems place objects in separated areas of a conveyor belt, and divert the objects from the conveyor belt at the desired destination. Any sorting system that places individual objects in a designated destination area for sorting can benefit from the present invention, which places two or more objects bound for the same destination in the same designated destination area.

At the feeding station 20, a plurality of upper feed conveyors 40, designated 40A, 40B, 40C, 40D are positioned to load packages P onto upper level tilt trays 25. Similarly, a plurality of lower feed conveyors 42 are positioned to load packages onto lower tilt trays 27. The trays 25 and 27 preferably move continuously through the feeding station which loads them while they are moving, but, in the alternative, the trays may pause at each feed conveyor and index between them.

The terms "conveyor" and "conveying device" when used herein means any device capable of conveying objects.

Figure 5:
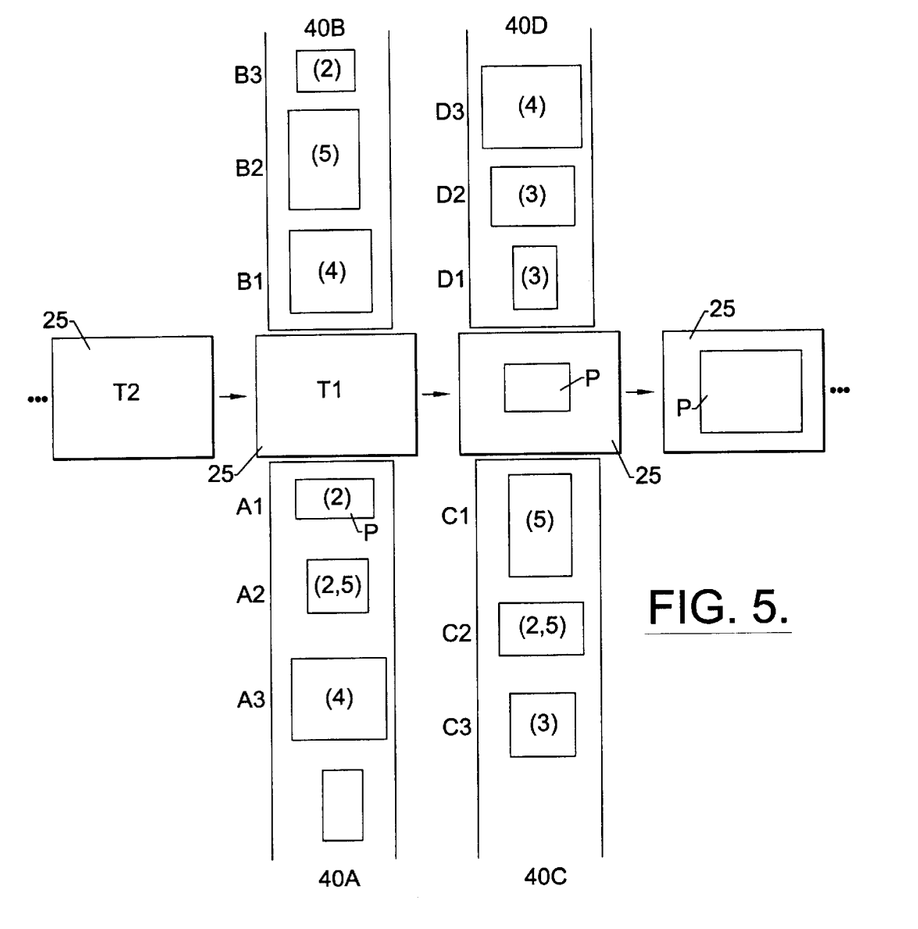
FIG. 5 is a diagram showing relative starting positions of one group of packages.

Several arrangements of the feed conveyors 40 are possible. FIG. 1 shows feed conveyors 40A and 40B positioned directly across from each other, and feed conveyor 40C positioned a distance downstream from conveyor 40A. FIG. 5 shows diagrammatically a preferred configuration in which conveyors 40A and 40B are directly across from each other, and conveyors 40C and 40D are directly across from each other and immediately adjacent to conveyors 40A and 40B, respectively. The feed conveyors that are directly across from one another may load different trays at different times, or the same tray at the same time. As described below, the downstream feed conveyors, such as 40C and 40D in FIG. 5, can load the same tray at the same time, load trays individually, or add a package to a tray previously loaded with a package by an upstream feed conveyor.

An optical scanner 45, such as a CCD camera or a laser bar code scanner, is mounted above each feed conveyor 40 and 42. As each package passes beneath the scanner 45, data pertaining to the package's ultimate (or intermediate) destination is read from the surface of the package (usually from a label). An image obtained by the scanner 45 also may be analyzed to determine dimensions of the package. However, in the embodiment shown, a phototransmitter/photocell pair 47a/48a is mounted so that the beam from the phototransmitter passes above the upper feed conveyor 40 in the path of packages traveling toward the tilt trays. A similar pair 47b/48b projects a beam above the lower feed conveyor 42. The speed of the feed conveyors is known. By measuring the time period from the time at which the leading edge of a package breaks the beam until the tailing edge clears the beam, the dimension of the package in a direction along the feed conveyor can be calculated. In the alternative, a roller sensitive to weight may be incorporated into the feed conveyor and monitored to provide the time taken by a package to traverse the roller, and the same dimension calculated based on the speed of the conveyor. This dimension in the feed direction will be referred to arbitrarily herein as the "width" of the package, even though sometimes it may be the longer dimension of the package. As described below, the width of the packages will be compared with the width of the tilt trays in determining whether more than one package will fit onto a tray. Such groups of packages that will fit onto one tray are sometimes referred to herein as complementary packages.

Each feed conveyor 40, 42 also has an associated load cell array 50a, 50b, respectively, positioned beneath the upper run of the conveyor to measure the weight of the packages in a known manner. A conventional position encoder 52 tracks the movement of the feed conveyor beginning at the position of the scanner 45. Thus, upon identifying a particular package at the scanner 45, its position on the feed conveyor and then along the monorail 22 is known at all times.

The movement of the carriages 23, the operation of the feeding stations 20, and the operation of the unloading stations 30 are controlled and coordinated by a programmable controller 60, shown diagrammatically in FIG. 3. The controller 60 may be a programmed logic controller (PLC), or a general purpose microprocessor, such as a personal computer. Methods for programming the controller 60 to carry out the operational steps needed to operate the sorting system 10 in the manner described herein are well known to those skilled in the programming art. Once the packages are loaded onto particular tilt trays, the operation of the sorting system is as described in U.S. Pat. No. 5,570,773. Therefore, the following description will focus on the operation of the feeding stations.

Figure 4:
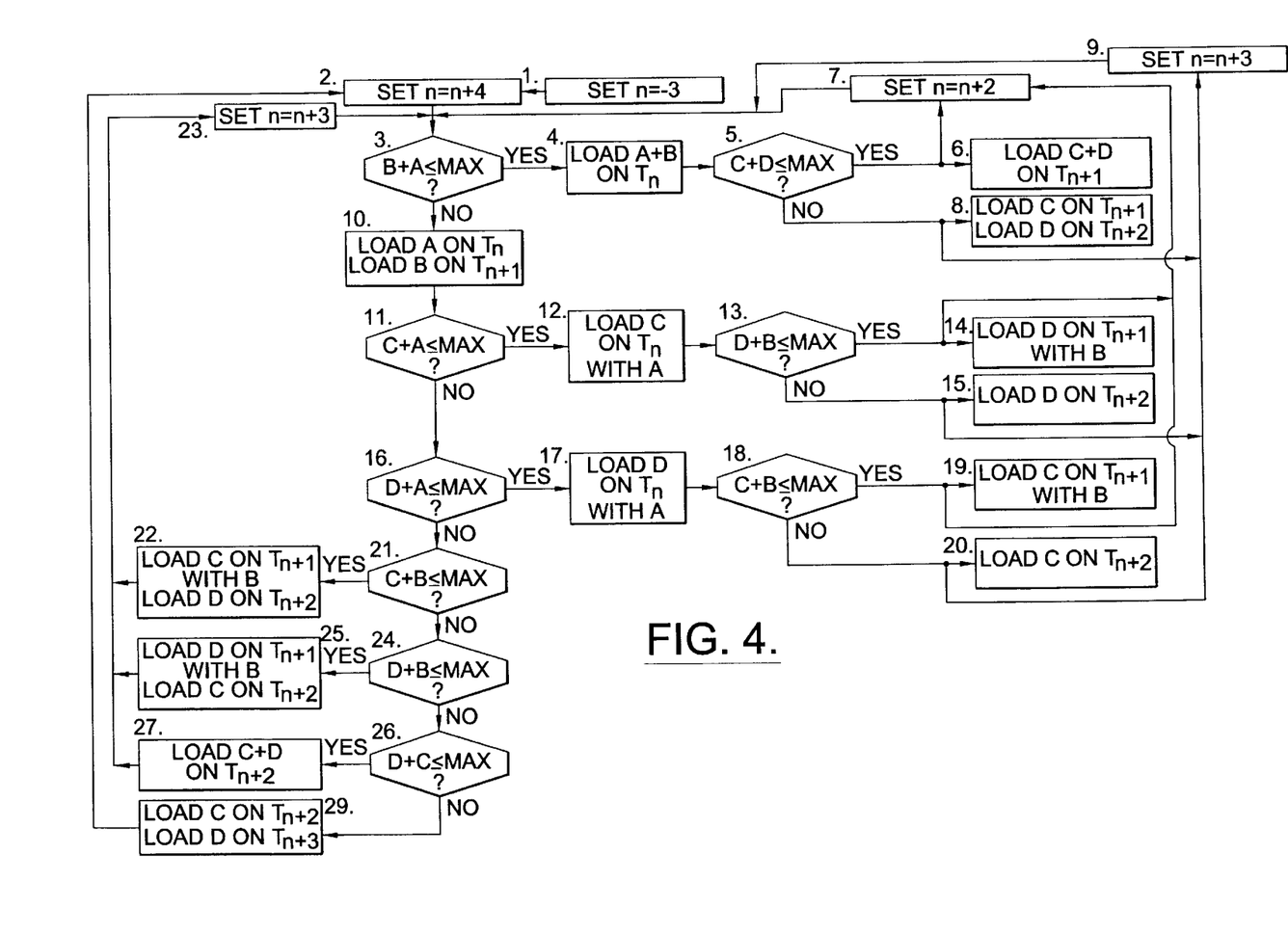
FIG. 4 is a flow chart illustrating a mode of operation of the feeding system of FIG. 1.

A flow chart showing one mode of operation of the upper feed conveyors 40A–40D of one of the feeding stations 20 is shown in FIG. 4. Operation of the lower feed conveyors is similar and will not be described separately. FIG. 5 shows the feed conveyors 40A–40D at a moment in time at which the particular packages shown have been processed to determine destination and dimension data, and are waiting to be loaded onto the tilt trays in accordance with the logic of FIG. 4. In this mode of operation, the controller loads the oncoming trays from each of the feed conveyors 40A–40D in turn, except when a package adjacent to the line of tilt trays on another aligned or downstream feed conveyor will also fit with a previously loaded package on one tilt tray.

With reference to FIG. 4, the package on feed conveyor 40A adjacent to the tilt trays, and the width of that package, are referred to by the letter A, and the letters B, C, and D are similarly defined with reference to the other feed conveyors.

At block 1 of the flow chart of FIG. 4, the controller initially sets a counter n equal to –3, and then at block 2 immediately sets n equal to n+4, that is, n=1. This counter n refers to the tilt trays 25 passing through the feed station 20. Tray $T_n$ is the tilt tray initially aligned with feed conveyors 40A and 40B. Tray $T_{n+1}$ is the next upstream tray, and so on. When n corresponds to the last tray prior to $T_1$ again reaching the feeding station, the process can be restarted at block 1. At block 3, the controller tests to see if the measured widths of the packages on conveyors 40A and 40B adjacent to the tray $T_n$ add to less than or equal to a width threshold "Max." Max is determined based on the width of the tilt trays, and preferably is somewhat less than the width of the trays. If the feed conveyors operate at a high speed, a relatively greater differential between the tray width and Max is needed to prevent bumping previously loaded packages off the tray. If the sum of the widths A+B is less than or equal to Max, at block 4 the conveyors 40A and 40B simultaneously load the awaiting packages onto tray $T_n$. Next, at block 5, the controller tests whether the measured widths of the packages on conveyors 40C and 40D adjacent to the line of tilt trays add to less than or equal to the width threshold "Max." If so, at block 6, the conveyors 40C and 40D simultaneously load the awaiting packages onto tray $T_{n+1}$. The controller sets n=n+2 at block 7 and returns to block 3, all of the packages initially adjacent to the line of trays having been loaded. The process then will begin again, with tray $T_3$ adjacent to conveyors 40A and 40B.

If the test of C+D at block 5 is negative, then at block 8 the feed conveyor 40C loads a package onto tray $T_{n+1}$, feed conveyor 40D loads a package onto tray $T_{n+2}$, and the controller at block 9 sets n=n+3 and returns to block 3. The process then will begin again, with tray $T_4$ adjacent to conveyors 40A and 40B.

If the test of B+A at block 3 is negative, then at block 10 the conveyor 40A loads a package onto tray $T_n$ and conveyor 40B loads a package onto tray $T_{n+1}$. Then at block 11 the controller tests whether the measured widths of the packages on conveyors 40A and 40C adjacent to the line of tilt trays add to less than or equal to the width threshold "Max." If so, at block 12 the conveyor 40C loads a package onto tray $T_n$ with the package from conveyor 40A. Next, at block 13, the controller tests whether the measured widths of the packages on conveyors 40B and 40D adjacent to the line of tilt trays add to less than or equal to the width threshold "Max." If so, the feed conveyor 40D loads a package onto tray $T_{n+1}$, with a package from conveyor 40B, and the controller at block 7 sets n=n+2 and returns to block 3.

If the test of B+D at block 13 is negative, then at block 15 the feed conveyor 40D loads a package onto tray $T_{n+2}$, and the controller at block 9 sets n=n+3 and returns to block 3.

If the test of C+A at block 11 is negative, at block 16 the controller tests whether the measured widths of the packages on conveyors 40A and 40D adjacent to the line of tilt trays add to less than or equal to the width threshold "Max." If so, at block 17 the conveyor 40D loads a package onto tray $T_n$ with the package from conveyor 40A. Next, at block 18, the controller tests whether the measured widths of the packages on conveyors 40B and 40C adjacent to the line of tilt trays add to less than or equal to the width threshold "Max." If so, at block 19 the feed conveyor 40C loads a package onto tray $T_{n+1}$, with a package from conveyor 40B, and the controller at block 7 sets n=n+2 and returns to block 3.

If the test of B+C at block 18 is negative, then at block 20 the feed conveyor 40C loads a package onto tray $T_{n+2}$, and the controller at block 9 sets n=n+3 and returns to block 3.

If the test of D+A t block 16 is negative, then at block 21 the controller tests whether the measured widths of the packages on conveyors 40C and 40B adjacent to the line of tilt trays add to less than or equal to the width threshold "Max." If so, at block 22 the feed conveyor 40C loads a package onto tray $T_{n+1}$, with a package from conveyor 40B, feed conveyor 40D loads a package onto tray $T_{n+2}$, and the controller at block 23 sets n=n+3 and returns to block 3.

If the test of C+B at block 21 is negative, at block 24 the controller tests whether the measured widths of the packages on conveyors 40D and 40B adjacent to the line of tilt trays add to less than or equal to the width threshold "Max." If so, at block 25 the feed conveyor 40D loads a package onto tray $T_{n+1}$, with a package from conveyor 40B, feed conveyor 40C loads a package onto tray $T_{n+2}$, and the controller at block 23 sets n=n+3 and returns to block 3.

If the test of D+B at block 24 is negative, at block 26 the controller tests whether the measured widths of the packages on conveyors 40C and 40D adjacent to the line of tilt trays add to less than or equal to the width threshold "Max." If so, at block 27, the conveyors 40C and 40D simultaneously load the awaiting packages onto tray $T_{n+2}$.and the controller sets n=n+3 at block 23 and returns to block 3.

If the test of D+C at block 26 is negative, then at block 29 the feed conveyor 40C loads a package onto tray $T_{n+2}$, feed conveyor 40D loads a package onto tray $T_{n+3}$, and the controller returns to block 2, setting n=n+4. The process then will begin again, with tray $T_5$ adjacent to conveyors 40A and 40B.

EXAMPLE 1

In the example shown in FIG. 5, the width of the trays is six units, and Max is selected to be 5 units. The feed direction dimension, or width, in units of the first three rows of packages on feed conveyors 40A–40D are given in the following Table 1, which represents data stored in memory associated with the controller 60.

TABLE 1

|  | 40A | 40B | 40C | 40D |
|---|---|---|---|---|
| Row 1 | 2.0 | 4.0 | 5.0 | 3.0 |
| Row 2 | 2.5 | 5.0 | 2.5 | 2.0 |
| Row 3 | 3.5 | 4.0 | 4.0 | 4.0 |

The results of applying the algorithm shown in FIG. 4 to the situation shown in FIG. 5 and Table 1 are represented in Table 2 as follows, with the contents identifying cells (column/row) in Table 1:

TABLE 2

| Tilt Tray $T_n$ | Contents | Total Width (units) |
|---|---|---|
| $T_1$ | 40A/1 + 40D/1 | 5 |
| $T_2$ | 40B/1 | 4 |
| $T_3$ | 40C/1 | 5 |
| $T_4$ | 40A/2 + 40C/2 | 5 |
| $T_5$ | 40B/2 | 5 |
| $T_6$ | 40B/3 + 40D/2 | 5 |
| $T_7$ | 40A/3 | 4 |
| $T_8$ | 40C/3 | 3 |
| $T_9$ | 40D/3 | 4 |

In this example, twelve packages are fit onto nine tilt trays, increasing the capacity of the sorting system by 25%.

EXAMPLE 2

Figure 6:
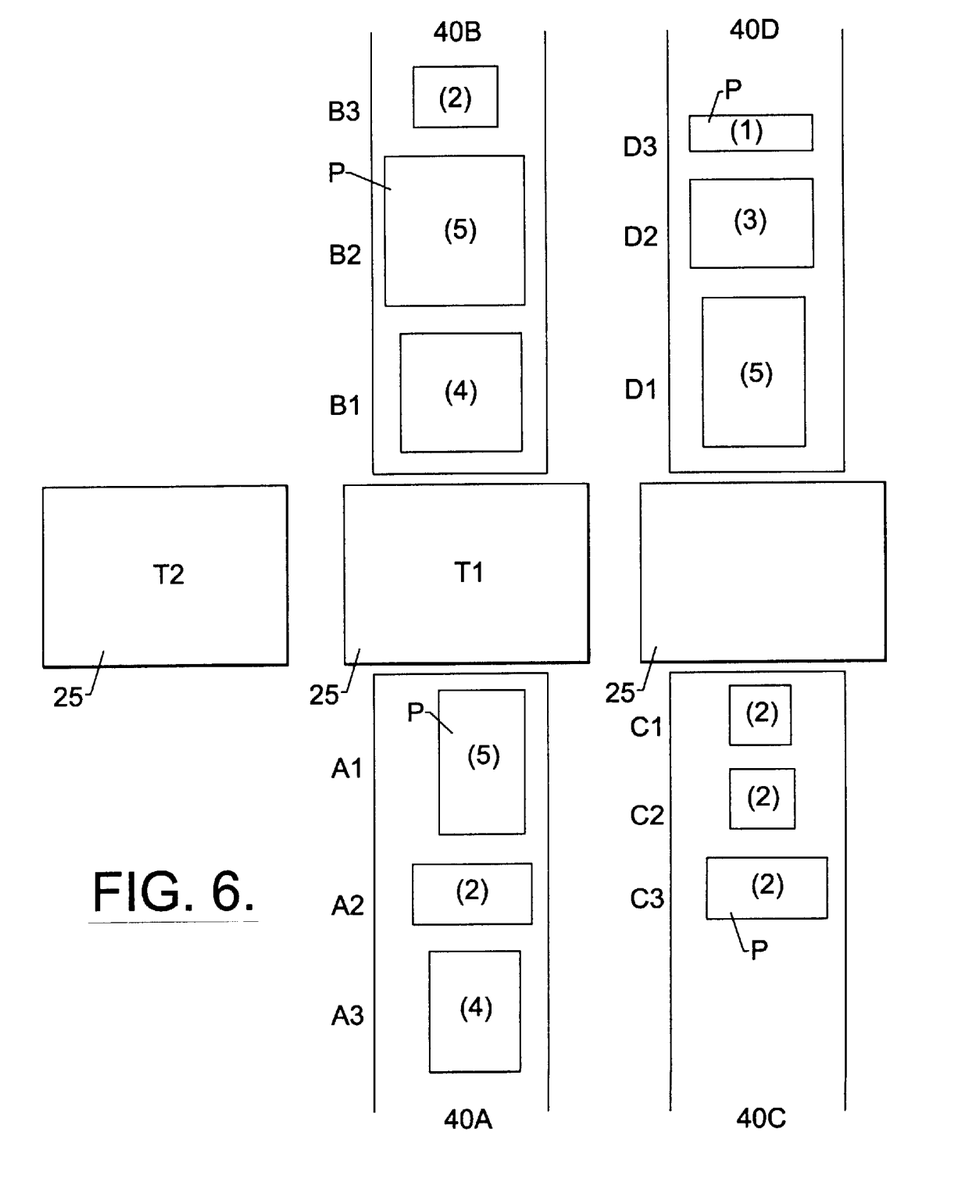
FIG. 6 is a diagram showing relative starting positions of another group of packages.

FIG. 6 and Table 3 demonstrate another scenario in which the method of the present invention may be applied to increase the capacity of the sorting system. By modifying the logic of FIG. 4, the results shown in Table 4 can be obtained. In the modified mode of operation, the controller examines in its memory all the package dimensions in a selected number of rows. The controller loads the oncoming trays from each of the feed conveyors 40A–40D in turn, except that it holds back a package adjacent to the line of tilt trays to wait for a complementary package on another feed conveyor to become available so that the two complementary packages can be loaded on one tilt tray. In this example, the package at feed conveyor 40C/1 is held to be combined with the package initially at 40A/2.

TABLE 3

|  | 40A | 40B | 40C | 40D |
|---|---|---|---|---|
| Row 1 | 5.0 | 4.0 | 2.0 | 5.0 |
| Row 2 | 2.0 | 5.0 | 2.0 | 3.0 |
| Row 3 | 4.0 | 2.0 | 2.0 | 1.0 |

TABLE 4

| Tilt Tray $T_n$ | Contents | Total Width (units) |
|---|---|---|
| $T_1$ | 40A/1 | 5 |
| $T_2$ | 40B/1 | 4 |
| $T_3$ | 40D/1 | 5 |
| $T_4$ | 40A/2 + 40C/1 | 4 |
| $T_5$ | 40B/2 | 5 |
| $T_6$ | 40C/2 + 40D/2 | 5 |
| $T_7$ | 40A/3 + 40D/3 | 4 |
| $T_8$ | 40B/3 + 40C/3 | 3 |

In this example, twelve packages are fit onto eight tilt trays, increasing the capacity of the tilt tray sorter by 33%.

EXAMPLE 3

In this example, the tilt tray drive is operated to slow or pause the train of carriages 23 as they arrive adjacent to feed conveyors 40 which contain two successive packages whose total width is less than Max and which are bound for the same destination. The controller slows the carriage train only if the conditions for loading two packages are met. The controller then operates the feed conveyor to load both packages from that conveyor onto the adjacent tilt tray. The slowing or pausing of the tilt tray allows both packages from the same feed conveyor to securely land on the same tilt tray, whereas the second package might fall off the trailing edge of the tilt tray if the carriages were moving too fast. This alternative operating mode has the disadvantage that the slowing of the carriages tends to the throughput rate of the sorting system. However, if the feeding station has only one feed conveyor, the net result of slowing only when it is possible to place two packages on the same tilt tray may be to increase the throughput rate.

Figure 7:
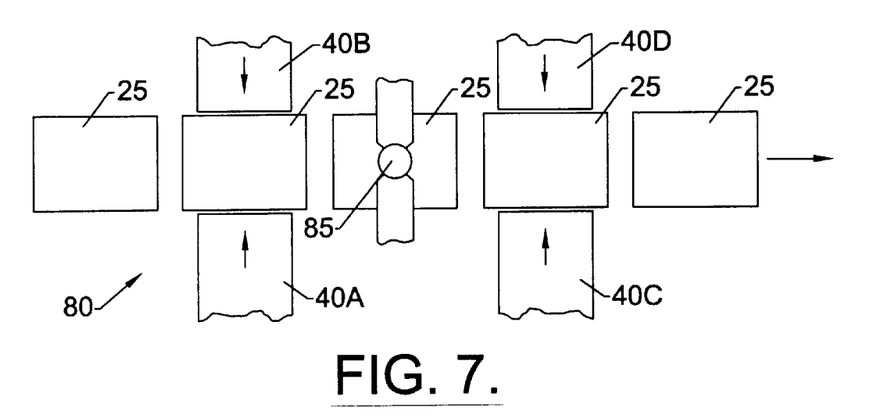
FIG. 7 is a diagrammatic top view of a second embodiment of a feeding system according to the invention, in which an image of a first tray is obtained after initial loading.
Figure 8:
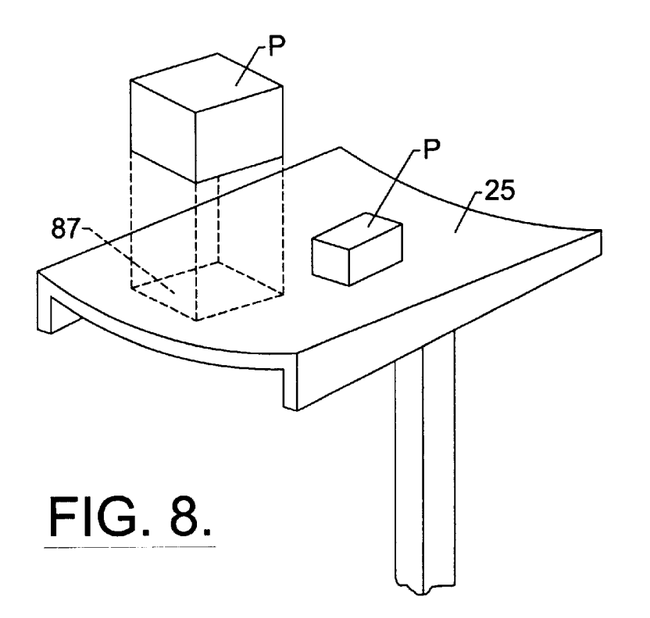
FIG. 8 is an isolated pictorial view of a package lifted away from a tray to show the footprint of the package.

A second embodiment of a feeding system 80 according to the present invention is shown in FIGS. 7 and 8. The feeding system 80 uses a different technique to determine when packages are complementary. An imaging camera 85, such as a CCD camera, is mounted over the line of tilt trays 25 between the aligned feed conveyors 40A,40B and the aligned feed conveyors 40C,40D. The camera 85 obtains an image of the tilt tray 25 after it has been loaded by feed conveyor 40A and/or 40B. Using conventional image processing techniques, the controller determines the footprint 87 of the previously loaded package or packages, as shown in FIG. 8, and the remaining area of the tray 25. Also, the scanners 45 on the feed conveyors 40C and 40D are imaging cameras which provide to the controller the footprint dimensions of the packages as they travel along the feed conveyor. By comparing the remaining available area of the tray 25 to the footprint of the packages waiting for loading at feed conveyors 40C and 40D, the controller determines whether one of the waiting packages can be loaded on the same tray.

In accordance with the feeding system of FIG. 7, the controller may vary the longitudinal position at which a second package is loaded on a previously occupied tilt tray, so that the decision whether a tray can accommodate more than one package is not always limited by the combined widths of the packages. For example, two packages, both almost as wide as the tilt tray but having a combined "length" less than the length of the tilt tray, can be loaded adjacent to one another in the alignment shown in FIG. 8. Of course, two packages with complementary widths may be placed in the configuration shown in FIG. 2. To facilitate more precise placement of the packages, the line of tilt trays may be slowed or paused at the feed conveyors in the embodiment of FIG. 7.

In a modification of either of the described embodiments of the invention, the weight of the packages measured by the load cell array 50 may also be used to determine whether two or more packages can be placed on a single tilt tray. According to this mode of operation, a maximum weight threshold for the trays is established, and when the dimensions of the trays permit their common loading, their combined weight must be equal to or less than the weight threshold before the controller will allow them to be loaded on the same tray.

From the foregoing, it will be seen that sorting systems utilizing the present invention enjoy an increased throughput rate by safely placing two or more packages on a single package conveying device when permitted by the relationship between the size of the packages and the size of the tray.

While this invention has been described in detail with particular reference to a preferred embodiment thereof, it will be understood that modifications and variations may be made without departing from the scope of the invention as defined in the appended claims.

What is claimed is:

1. A sorting system for the automated sorting of objects comprising
   a conveying device for transporting and distributing a series of objects from at least one feeding station to a plurality of unloading stations and having a plurality of designated destination areas thereon,
   a feeding system at said feeding station for loading objects onto said designated destination areas of said conveying device,
   a data input device for indicating a destination and a dimension of each of said objects to be loaded by said feeding system, and
   a programmable controller for said conveying device and said feeding system and being connected to said data input device for receipt of said destination and dimension data therefrom, said controller being responsive to said destination and dimension data to determine when two or more objects sharing a common destination will fit within a single destination area of said conveying device and causing said feeding system to load said two or more objects onto said single destination area of said conveying device.

2. The sorting system of claim 1, wherein said feeding station comprises two or more feed conveyors positioned to load objects onto said conveying device, said controller being responsive to said destination and dimension data to operate said feed conveyors to load two or more objects onto said designated destination area, one or more of said objects from each of said feeding conveyors.

3. The sorting system of claim 1, wherein said designated destination area of said conveying device comprises a tilt tray, and wherein said dimension of the objects is a width of each of the objects in a feed direction in which said object moves during loading, and wherein said controller compares the combined width of the objects to the width of said tray to determine when two objects sharing a common destination will fit on said try.

4. The sorting system of claim 1, wherein said data input device includes sensors operative to measure the width between the leading and trailing edges of objects as the objects move on said feeding conveyor.

5. The sorting system of claim 1, wherein said data input device includes an optical scanner positioned to read destination indicia affixed to the objects.

6. The sorting system of claim 1, wherein said designated destination area of said conveying device comprises a tilt tray, and wherein said controller defines a first footprint of the first object on said tray, and a second footprint of the second object, and compares a combined footprint of said objects to a footprint threshold to determine when two objects sharing a common destination will fit on said tray.

7. The sorting system of claim 1 further comprising a scale connected to said programmable controller for determining the weight of each of the objects to be placed within said designated destination area, said programmable controller comparing a combined weight of said objects to an acceptable weight threshold prior to loading said second object.

8. The feeding system of claim 7 wherein said scale comprises a plurality of load cells positioned underneath said feed conveyor.

9. A method for placing a plurality of objects on a conveying device of a sorting system adapted to transport and distribute a series of objects from loading stations to unloading stations of the sorting system, said method comprising the steps of:
   reading destination information from said objects;
   measuring a dimension of said objects;
   at a first loading station, loading a first object onto said conveying device within a designated destination area;
   determining whether a second object having the same destination as said first object will fit within said designated destination area with said first object; and
   if said second object will fit within said designated destination area with said first object, loading said second object onto said designated destination area.

10. The method of claim 9, wherein said step of loading said second object occurs at a second loading station while continuing to move said conveying device.

11. The method of claim 9 further comprising the step of reading a destination and measuring a dimension of a third object, determining whether said third object has the same destination as said first object and will fit within said designated destination area with said first and second objects, and, if so, loading said third object onto said conveying device in said designated destination area with said first and second objects.

12. The method of claim 11, wherein said step of loading said second object occurs at a second loading station and said step of loading said third object occurs at a third loading station while continuing to move said conveying device.

13. The method of claim 9 wherein said designated destination area of said conveying device comprises a tilt tray, and wherein said step of measuring a dimension comprises measuring a width of each of the objects in a feed direction in which said object moves during said loading step, and said step of determining whether an object will fit on said tray with another object comprises comparing the combined width of the objects to the width of said tray, the loading step occurring when the combined width is no greater than the width of said tray.

14. The method of claim 9 wherein said designated destination area of said conveying device comprises a tilt tray, and wherein said step of determining a dimension comprises defining a first footprint of the first object on said tray, and said step of determining whether an object will fit on said tray with another object comprises defining a second footprint of the second object and defining a combined footprint from the first and second footprints, and comparing the combined footprint to an acceptable footprint threshold based on the area of said tray.

15. The method of claim 9 further comprising the steps of determining the weight of said first and second objects, and comparing a combined weight of said objects to an acceptable weight threshold prior to loading said second object.

16. A feeding system for use with a sorting system of the type having a plurality of trays movable under the control of a programmable controller to transport and distribute a series of objects from at least one feeding station to a plurality of unloading stations, said feeding system comprising:

a scanner adapted to read address information from said objects;

an optical sensor adapted to determine a width of said objects in a feeding direction;

said scanner and said optical sensor being connected to provide to said programmable controller data indicating a destination and a dimension of each of said objects; and at least two feed conveyors positioned to load said objects onto said trays;

said controller being responsive to said destination and dimension data to determine when two objects sharing a common destination will fit within a single tray, and to operate said feed conveyors to load said two objects onto said single tray, one from each of said feeding conveyors.

17. A feeding system for use with a sorting system of the type having a conveying device movable under the control of a programmable controller to transport and distribute a series of objects from at least one feeding station to a plurality of unloading stations, said feeding system comprising:

a data input device connected to provide to said programmable controller data indicating a destination and a dimension of each of said objects;

and at least two feed conveyors positioned at said feeding station to load said objects onto designated destination areas of said conveying device;

said controller being responsive to said destination and dimension data to determine when two objects sharing a common destination will fit within a single designated destination area of said conveying device, and to operate said feed conveyors to load said two objects onto said designated destination area, one from each of said feeding conveyors.

18. The feeding system of claim 17, further comprising a third feed conveyor positioned to load objects onto said conveying device, said controller being responsive to said destination and dimension data to determine when three objects sharing a common destination will fit within said designated destination area of said conveying device, and to operate said feed conveyors to load said three objects onto said designated destination area, one from each of said feeding conveyors.

19. A sorting system, comprising:

a conveying device movable between at least one loading station and a plurality of unloading stations;

said loading station including a feeding system for placing a plurality of objects on said conveying device, comprising:

a data input device;

a programmable controller connected to receive from said data input device data indicating a destination and a dimension of each of said objects; and one or more feed conveyors positioned to load said objects onto designated destination areas of said conveying device;

said controller being responsive to said destination and dimension data to determine when two or more objects sharing a common destination will fit within a single designated destination area of said conveying device, and to operate said one or more feed conveyors to load said two or more objects onto said designated destination area.

20. The feeding system of claim 19, wherein said feeding system comprises two or more feed conveyors positioned to load objects onto said conveying device, said controller being responsive to said destination and dimension data to operate said feed conveyors to load two or more objects onto said designated destination area, one or more of said objects from each of said feeding conveyors.

* * * * *